United States Patent Office 2,839,367
Patented June 17, 1958

2,839,367

PREPARATION OF CRYSTALLINE BORON

David R. Stern, Fullerton, and Lahmer Lynds, North Hollywood, Calif., assignors to American Potash & Chemical Corporation, a corporation of Delaware No Drawing. Application April 9, 1957
Serial No. 651,577

5 Claims. (Cl. 23—209)

This invention relates to a novel process for the preparation of boron of high purity. By this process boron can be recovered as such, or it can be applied as a protective coating to a surface, as desired.

It is known that the various boron halides react with hydrogen to form the corresponding hydrogen halide and boron. We have found that if this reaction is conducted in the presence of a suitable heated filament such as one made of titanium, boron is deposited upon the filament, while the hydrogen halide is removed as a vapor.

In place of using a titanium filament, one can use a zirconium filament. Titanium and zirconium have relatively high melting points, 1800° and 1900° C., respectively. We have found that they form good conductive cores and deposits such that low resistance is realized in all temperature ranges. Temperatures above 1000° C. are preferred to insure that the boron deposit is crystalline; below 1000° C. the deposit is less crystalline and is more of an amorphous nature. Further, these filaments possess structural strength and at the same time are relatively inexpensive. Additionally, they form dense borides so that classification with a suitable organic liquid can readily be accomplished. The density of titanium boride is 4.5, the density of zirconium boride is 6.085, while that of boron is 2.4. By utilizing a suitable liquid such as methylene dibromide (density, 2.495) a ready physical separation can be made by the sink-float method.

We have prepared massive boron deposits 2–3 inches in diameter on titanium filaments ⅛ to 3/16 inches in diameter. In a typical operation, a suitable mixture of boron trichloride and hydrogen are injected into the reactor in which a titanium filament is maintained at 1050°–1150° C. In one operation the filament was 3/16" in diameter and six inches long. The hydrogen-boron trichloride mole ratio was 8.4 to 1 and the rate of feed was such that a residence time of 2.4 minutes gave optimum results with respect to conversion per pass (13.6%) and average deposition rate (7.1 grams per hour). In 72 hours, a 514 gram deposit of crystalline boron was formed.

By grinding the deposit on the filament and classifying them with a suitable liquid as methylene dibromide, it is possible to separate much of the iron, titanium, and titanium boride and to obtain boron purities in excess of 98 percent. Analysis of the initial crude product, an upgraded material and the surface material are given in the following table:

| Product | Percent B | Percent Ti | Percent Fe | Percent Si | Percent HNO₃ Insol. |
|---|---|---|---|---|---|
| −100 mesh (not up-graded) | 98.1 | 0.81 | 0.02 | 0.19 | 0.71 |
| −100 mesh surface | 99.0 | 0.29 | 0.008 | 0.14 | 0.88 |
| −100 mesh (up-graded by density classification method) | 98.5 | 0.69 | 0.02 | 0.06 | 0.52 |

With a large deposition to filament diameter ratio, contamination is minimized and boron purities of 98 to 99 percent are obtainable without practicing any up-grading procedure; surface samples consistently analyze 99% boron and more.

Both titanium and zirconium have a further advantage in that each forms volatile chlorides at temperatures less than 550° C., which is the reported minimum temperature requirement for the reaction of boron with chlorine. By utilizing a chlorination step, it is possible to effect a further up-grading of the materials. For example, by grinding the boron deposits, including the filament and subjecting these to a subsequent chlorination operation at a temperature of the order of 300°–400° C., it is possible to remove substantially all of the filament component present as a volatile chloride, thus resulting in a marked-up grading.

| | Percent B | Percent Ti | Percent Fe | Percent HNO₃ Insol. | Percent Total |
|---|---|---|---|---|---|
| Before chlorination | 95.2 | 4.7 | 0.13 | 1.0 | 100 |
| After chlorination | 98.7 | 1.4 | 0.02 | 0.33 | 100 |

This classification technique is not applicable to boron deposited on graphite filaments since boron, graphite, and boron carbide have almost the same density. A chemical separation would also be impractical.

The apparatus employed is relatively simple, e. g., a simple chamber through which the gases are passed and in which the filament is supported in spaced relation to the walls so the gases can flow over the filament. One can use any of the boron halides, this being merely a matter of temperature level and of handling the particular end product, HF, HI, HBr or HCl. The hydrogen to halide ratio can vary widely as between 5 and 12 to 1, although with the higher ratios a greater conversion per pass is achieved as is apparent from the following:

| Mol Ratio ($H_2/BCl_3$) | Percent Conversion Per Pass |
|---|---|
| 5.7 | 8.5 |
| 9.3 | 10.3 |
| 12.2 | 10.4 |

We claim:

1. A process for producing elemental boron comprising passing a boron halide and hydrogen over a heated filament element to decompose the boron halide and deposit elemental boron on the filament, the filament element being one selected from the group consisting of titanium and zirconium and being at a temperature of about 1000° C.

2. A process for producing elemental boron comprising passing a boron halide and hydrogen over a filament heated to a temperature whereat the boron halide and hydrogen react to form a hydrogen halide and boron which is deposited as a coating on the filament, the filament element being one selected from the group consisting of titanium and zirconium and being at a temperature of at least 1000° C.

3. A process for producing elemental boron comprising passing a boron halide and hydrogen over a filament heated to a temperature of about 1000° C. and whereat the boron halide and hydrogen react to form a hydrogen halide and boron which is deposited as a coating on the filament, the filament element being one selected from the group consisting of titanium and zirconium, recovering the boron coated filament, grinding the entire coated filament to finely divided form, and separating the filament portion from the boron.

4. A process for producing elemental boron comprising passing a boron halide and hydrogen over a filament heated to a temperature of about 1000° C. whereat the boron halide and hydrogen react to form a hydrogen halide and boron which is deposited as a coating on the filament, the filament element being one selected from the group consisting of titanium and zirconium, recovering the boron coated filament, grinding the entire coated filament to finely divided form, and separating the filament portion from the boron by a sink-float gravity separation.

5. A process for producing elemental boron comprising passing a boron halide and hydrogen over a filament heated to a temperature of about 1000° C. and whereat the boron halide and hydrogen react to form a hydrogen halide and boron which is deposited as a coating on the filament, the filament element being one selected from the group consisting of titanium and zirconium, recovering the boron coated filament, grinding the entire coated filament to finely divided form, and passing chlorine over the ground coated filament to form the volatile tetrachloride of the filament element.

References Cited in the file of this patent

UNITED STATES PATENTS

| | | |
|---|---|---|
| 1,774,410 | Van Arkel | Aug. 26, 1930 |
| 2,253,471 | Muskat | Aug. 19, 1941 |

OTHER REFERENCES

"Boron" I. Preparation and Properties of Pure Crystalline Boron, A. W. Laubengayer, D. T. Hurd, A. E. Newkirk and J. L. Hoard—Journal of the American Chemical Society, vol. 65, October 1943, pages 1924 to 1931.